Oct. 7, 1969     C. H. HEITMAN     3,470,574
PRESSURE-SENSITIVE MEASURING TAPE FOR USE IN SHOE MANUFACTURE
Filed May 24, 1967
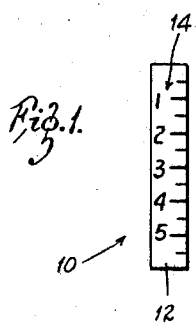
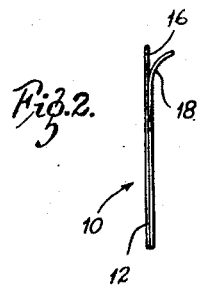
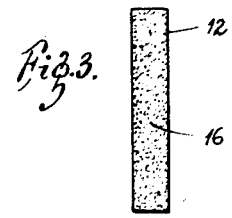
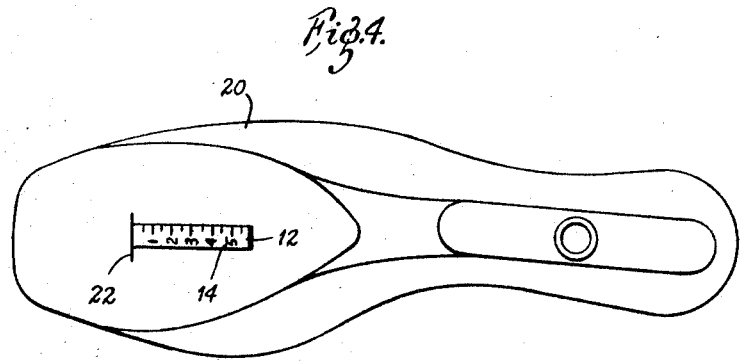
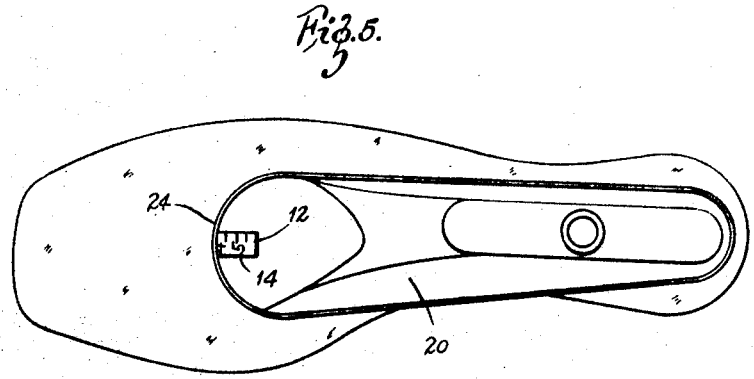
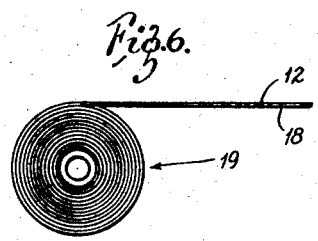
INVENTOR:
CLARENCE H. HEITMAN
By Kingsland, Rogers, Ezell, Eilers & Robbins
ATTORNEYS

United States Patent Office 3,470,574
Patented Oct. 7, 1969

3,470,574
PRESSURE-SENSITIVE MEASURING TAPE FOR
USE IN SHOE MANUFACTURE
Clarence H. Heitman, 2 York Hills,
St. Louis, Mo. 63144
Filed May 24, 1967, Ser. No. 640,960
Int. Cl. A43d 3/02
U.S. Cl. 12—142                                        2 Claims

ABSTRACT OF THE DISCLOSURE

A pressure-sensitive measuring tape having graduations and measuring indicia for use with shoe lasts. The pressure-sensitive tape may be positioned on the last in a uniform manner with the graduated indicia employed to measure the vamp length and border upon the last. The tape, which may be in coil form by transverse scoring into successive tapes, provides a ready reference to insure uniformity in vamp fabrication and eliminates the necessity of using scoring, measuring tacks, and the like upon the vamp.

Background of the invention

In the past, lasts have been marked with grooves, indentations, tacks, and the like, to provide a measuring mark for the fabrication of vamps. Such physical means have been subject to misreading, misalignment, and where alterations in the lasts are performed from one manufacture to another, new settings are required. The instant invention provides a ready employable pressure-sensitive measuring tape which may be affixed to a last in a uniform fashion, such that different numbers or measurements may be employed for different types of lasts without the requirement of reaffixation or resetting of a physical marking. Thus, by this invention, only a reading of the appropriate measurement indicia on the measuring tape is required to provide for the vamp fabrication measurement.

Summary of the invention

This invention employs a measuring tape made from a conventional pressure-sensitive tape. The tape may be plastic, cloth, or of other standard material of construction, with graduated measurement indicia and numbers provided on the tape. The pressure-sensitive tape is simply affixed to the last by tearing off a length of measuring tape along transverse score lines of a coil of the tape and then peeling off a protective paper layer, or the like. The tape is then secured by adhesion to the last. When the tape is affixed to the last, which is simply done by the operator by emplacing it in a standard fashion upon the longitudinal axis on the front of the last, different types of vamp fabrication may be uniformly made by reference to a particular measurement number upon the tape which defines a limit for the vamp upon the last.

The measuring tape may be employed by relatively unskilled workmen upon the last to provide a uniform measuring device at very low cost and with a high degree of efficiency and accuracy in the vamp fabrication.

The above features are objects of this invention and further objects will be apparent to those skilled in the art and in the detailed description which follows.

For the purpose of illustration of this invention, there is shown a preferred embodiment thereof in the accompanying drawings. It is to be understood that these drawings are for the purpose of example only and that the invention is not limited thereto.

In the drawings:

FIGURE 1 is a plan view of a pressure-sensitive measuring tape provided with measuring indicia;

FIGURE 2 is a view in side elevation of the tape with the protective backing partly peeled off;

FIGURE 3 is a bottom plan view of the tape showing the pressure-sensitive adhesive area;

FIGURE 4 is a top plan view of a last with the pressure-sensitive measuring tape attached thereto ready for use;

FIGURE 5 is a top plan view of a last with a shoe upper and showing the relation of the edge of the vamp overlying the measuring tape for ready measurement; and FIGURE 6 is a view in side elevation of a coil of tape with a length of tape ready for separation.

Detailed description

The measuring tape of this invention is generally indicated by the reference numeral 10 in FIGURE 1. It is composed of a strip-like body 12 having various graduated measuring indicia 14, which, in FIGURE 1, are shown with the numerals 1–5 and intermediate marks. The measuring indicia may be repeated when the tape is dispensed from a coil. The tape may be of any standard flexible material of construction such as cloth, plastic film, paper, or the like.

The tape, as shown in FIGURES 2 and 3, has a rear surface impregnated with a conventional pressure-sensitized adhesive 16. This is backed by a protective strip of material 18 of cloth, plastic film, paper, or the like, which is peeled off when the tape is ready to be used to expose the pressure-sensitive adhesive.

FIGURE 6 shows a coil of tape 19 with a length of tape ready for separation along conventional transverse score lines (not shown).

The tape is shown in use in FIGURE 4 where it is attached to a shoe last 20. The last may be provided with a reference marking 22, which is used to register the measuring tape upon the last as shown in this figure. The tape is then made ready for use by removing the protective strip 18 and placing the tape with the pressure sensitive adhesive upon the top of the last in the manner shown.

In the fabrication of a shoe upper, the vamp portion is stretched to the desired marking which in FIGURE 5 is shown at the numeral 4. It will be understood that for different styles of vamps different measurements may be employed on the same last, such as the measurement 3 or 5 on the measuring tape, as will be desired. It will be apparent that the shoe operator can stretch the vamp to the desired reference position so that the vamp boundary 24 is in proper registry at the desired marking on the measuring tape.

Through the use of the measuring tape, different vamp styles may be accommodated to the same last by simply using different numbers on the measuring tape for registry in stretching the vamp boundary 24 to the desired position for the new vamp construction. The measuring tape is simple to employ and can be used by relatively unskilled workmen with a high degree of efficiency and accuracy.

Various changes and modifications may be made within this invention as will be readily apparent to those skilled in the art. Such changes and modifications are within the scope and teaching of the invention as defined by the claims appended hereto.

What is claimed is:

1. A shoe last having means for measuring a vamp in the manufacture of shoes, said means comprising a measuring tape affixed by a pressure-sensitive adhesive to the top of the last at the front portion thereof and extending backwards along the longitudinal axis of the last, said measuring tape having graduated markings on one side and pressure-sensitive adhesive on the opposite side whereby the tape may be removably secured to the top of the last.

2. In the manufacture of shoes the improvement comprising a method of measuring the vamp positioning upon a shoe last, said method comprising affixing a pressure-sensitive measuring tape provided with graduated markings to the top of the last at the front portion thereof and extending said tape backwardly along the longitudinal axis of the last and performing a vamp manufacturing operation by registering the vamp edge upon a selected marking of the measuring tape.

References Cited

UNITED STATES PATENTS

| | | | |
|---|---|---|---|
| 2,187,087 | 6/1938 | Leary | 33—137 |
| 2,772,650 | 5/1955 | Cook | 33—137 |
| 2,932,897 | 9/1961 | Huber | 33—137 |
| 3,276,055 | 10/1966 | Batchelder et al. | 12—142 |

PATRICK D. LAWSON, Primary Examiner

U.S. Cl. X.R.

12—133; 33—137